United States Patent
Dettinger et al.

(10) Patent No.: US 7,558,785 B2
(45) Date of Patent: Jul. 7, 2009

(54) EXTRAPOLATING CONTINUOUS VALUES FOR COMPARISON WITH DISCRETE VALUED DATA

(75) Inventors: Richard D. Dettinger, Rochester, MN (US); Judy I. Djugash, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 11/165,385

(22) Filed: Jun. 23, 2005

(65) Prior Publication Data

US 2006/0294065 A1    Dec. 28, 2006

(51) Int. Cl.
    *G06F 17/30* (2006.01)
(52) U.S. Cl. .............................................. 707/3; 707/6
(58) Field of Classification Search ................. 707/1–6, 707/100, 102
    See application file for complete search history.

(56) References Cited

U.S. PATENT DOCUMENTS

| | | | |
|---|---|---|---|
| 6,725,227 B1 | 4/2004 | Li | |
| 6,850,937 B1 * | 2/2005 | Hisamitsu et al. | 707/7 |
| 6,993,516 B2 * | 1/2006 | Haas et al. | 707/2 |
| 7,010,538 B1 * | 3/2006 | Black | 707/100 |
| 7,240,044 B2 * | 7/2007 | Chaudhuri et al. | 707/2 |
| 2002/0073115 A1 * | 6/2002 | Davis | 707/500.1 |
| 2003/0169284 A1 * | 9/2003 | Dettinger et al. | 345/708 |
| 2007/0143266 A1 * | 6/2007 | Tang et al. | 707/3 |

OTHER PUBLICATIONS

U.S. Appl. No. 10/083,075, "Application Portability and Extensibility Through Database Schema and Query Abstraction", filed Feb. 26, 2002.
U.S. Appl. No. 10/403,356, "Dealing With Composite Data Through Data Model Entities", filed Mar. 31, 2003.

* cited by examiner

*Primary Examiner*—Mohammad Ali
*Assistant Examiner*—Marc R Filipczyk
(74) *Attorney, Agent, or Firm*—Patterson & Sheridan, LLP

(57) ABSTRACT

A method, article of manufacture, and apparatus for processing continuous value data is disclosed. Data values stored in a database reflect a measurement of the value obtained for a specific point in time. In order to correlate the evaluation of two or more conditions, when measurements for each condition recorded at the same points in time are unavailable, embodiments of the invention provide a method for generating approximations of the unavailable values for comparison with others. Thereafter, a comparison between values for the points in time may be used to correlate the two conditions during query processing.

16 Claims, 9 Drawing Sheets

EXTRAPOLATING CONTINUOUS VALUES FOR COMPARISON WITH DISCRETE VALUED DATA

CROSS-REFERENCE TO RELATED APPLICATIONS

This application is related to commonly assigned, co-pending, U.S. patent application Ser. No. 10/083,075, filed Feb. 26, 2002, entitled "Application Portability and Extensibility through Database Schema and Query Abstraction," and application Ser. No. 10/403,356, filed Mar. 31, 2003, entitled "Dealing with Composite Data through Data Model Entities," both of which are incorporated herein by reference in their entirety.

BACKGROUND OF THE INVENTION

1. Field of the Invention

This invention generally relates to database query processing techniques for correlating data values for multiple conditions specified by a database query. More specifically, the present invention relates to query processing techniques for managing the execution of queries that include a comparison between discrete value property measurements and continuous value property measurements.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of columns, typically specified by a name and a data type (e.g., integer, float, string, etc). The columns of a table are used to store individual data values. For example, in a table storing data about patients treated at a hospital, each patient might be referenced using a patient identification number stored in a "patient ID" column, other columns could include "first name," "last name," etc. Each row of such a table provides data about a particular patient. Tables that share at least one attribute in common are said to be related. Further, tables without a common attribute may be related through other tables that do share common attributes. A path between two tables is referred to as a join, and columns from tables related through a join may be combined to form a new (logical) table, returned as a set of query results.

Database queries specify which columns to retrieve data from, conditions (a.k.a. predicates) that must be satisfied for a particular data value to be included in a query result table, and how to correlate data values from different columns. Current relational databases require that queries are composed in complex query languages. One such query language is the Structured Query Language (SQL). However, other query languages are used. An SQL query is composed from one or more clauses set off by keywords. Well-known SQL keywords include, e.g., the SELECT, WHERE, FROM, HAVING, ORDER BY, and GROUP BY keywords. Composing a proper SQL query requires that a user understand both the structure (i.e., the tables and columns) defined for a particular relational database and the complex syntax of the SQL query language (or other query language). This complexity, however, generally makes it difficult for average users to compose a desired query.

Also, an often overlooked, yet fundamental, aspect of database data collection is that databases are often used to record a measured value obtained for a particular point in time, despite the fact that the measured value captures data for a continuous property (e.g., the ambient temperature is always some measurable quantity at a given moment in time). Typically, each entry in a database may have an associated timestamp indicating when the entry was obtained, or when the entry was added to the database. This is a useful feature in many cases (e.g., a user wants to determine exactly when a financial transaction posted to their bank account).

In other situations, this aspect makes it difficult to evaluate certain types of queries. For example, users often desire to correlate multiple query conditions with one another. Consider, for example, a database record used to store a weight value for a given patient. Even though the data value is associated with a particular point in time, a person's weight is, in most cases, relatively constant. That is, most individuals weigh about the same day-to-day regardless of whether a value is captured in a database.

To build on this example, assume the database is also used to record test data values obtained from medical tests. If a user desired to compose a query that identified patients with an elevated hemoglobin test result over 40 who also weighed over 220 pounds at the time of the test, then, when executed, a query needs to (i) identify patients with the elevated hemoglobin test, and (ii) determine whether a patient with a high hemoglobin value has a weight value over 220. Alternatively, the query may be processed by first identifying patients with a weight value over 220, and then determining whether there is a corresponding hemoglobin test over 40. Either way, if weight and hemoglobin data values associated with a specific patient are recorded with different timestamp values, then a database query engine may, incorrectly, fail to include such a patient in a query result table because it does not have data values for each condition with the timestamp. Or worse, a query engine might compare any two such values (e.g., a weight measurement from three years ago compared against a hemoglobin test from three days ago). Thus, without the ability to correlate conditions, executing a query with multiple conditions may both fail to include patients in query results that should be, or include patients that should not.

The inability of current systems to correlate this type of data can result from a number of different situations arising from how the data is captured into the database. For example, test results may take days to generate and may be recorded into a database based on time that the test is completed or when the test is first performed; a hospitalized patient might be weighed when admitted, but not on each day during a hospital stay; an individual may not undergo both tests at the same time (e.g., a patient may visit a clinic to have blood drawn for the hemoglobin test without contemporaneously being weighed). These examples illustrate a few of many similar situations where current databases are unable to correlate data for multiple conditions, often because of how data is represented using measurements that are linked to a specific point in time.

Accordingly, there remains a need for techniques to correlate data for different data items in a database, and for query processing techniques for managing the execution of queries that include a comparison between discrete value property measurements and continuous value property measurements.

SUMMARY OF THE INVENTION

Embodiments of the invention generally allow users to compose a query wherein data for multiple conditions are temporally correlated when processing the query. Data with a continuous value may be then be correlated with discrete valued data to evaluate query conditions.

One embodiment provides a method of processing a computer database query. The method generally includes receiving a query, wherein the query includes a first condition, a second condition, and an indication that data values used to evaluate the first and second condition should be temporally correlated. The method generally further includes determining, for data values used to evaluate the first condition, a point in time associated with each data value, determining whether a data value for the second condition are recorded in the database for the same points in time as those determined for the data values of the first condition, and generating an approximated value for the second condition, corresponding to each point in time that does not have a data value recorded in the database, based on data values available for the second condition recorded for other points in time. Using the recorded and approximated values the method may also include evaluating the first and second condition using the recorded data value for the first condition and the approximated value for the second condition, and returning query results for the query, consistent with the evaluation.

Another embodiment of the invention includes a computer-readable medium containing a program, which when executed on a computer system performs an operation for accessing data stored in an underlying physical database. The operation generally includes receiving a query, wherein the query includes a first condition, a second condition, and an indication that data values used to evaluate the first and second condition should be temporally correlated. The operation generally further includes, determining, for data values used to evaluate the first condition, a point in time associated with each data value, and for each point in time, determining whether a data value for the second condition for the same point in time exists in the database, and generating an approximated value for the second condition, corresponding to each point in time that does not have a data value recorded in the database, based on data values available for the second condition recorded for other points in time.

Another embodiment of the invention provides a system for processing a database query. The system generally includes a computer configured to access a database, a query building interface configured to allow a user to compose a query that includes at least a first condition, a second condition, and an indication that data values used to evaluate the first and second condition should be temporally correlated. The query processing application is generally further configured to receive the query, and in response, to determine, for data values used to evaluate the first condition, a point in time associated with each data value, and for each point in time, to determine whether a data value for the second condition for the same point in time is recorded the database. The query application is generally further configured to generate an approximated value for the second condition for each point in time that does not have a data value recorded in the database, based on data values available for the second condition, recorded for other points in time.

BRIEF DESCRIPTION OF THE DRAWINGS

So that the manner in which the above recited features of the invention can be understood, a more particular description of the invention, briefly summarized above, may be had by reference to the exemplary embodiments illustrated in the appended drawings. Note, however, that the appended drawings illustrate only typical embodiments of this invention and should not, therefore, be considered limiting of its scope, for the invention may admit to other equally effective embodiments.

DETAILED DESCRIPTION OF THE PREFERRED EMBODIMENTS

Figure 1:
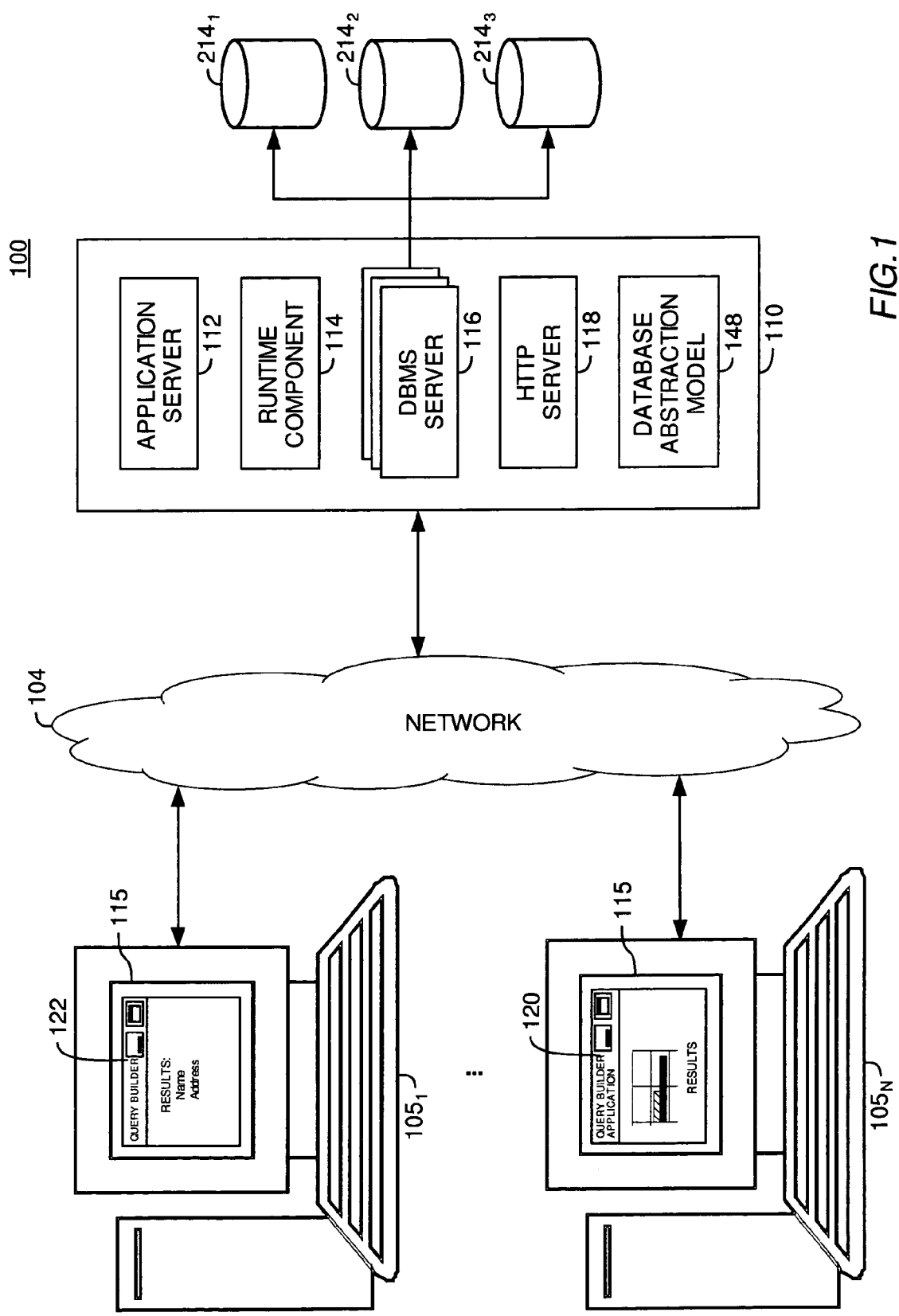
FIG. 1 is a functional block diagram illustrating interrelated components of a computer network that may be used to provide a platform for various embodiments of the invention.

The present invention may be practiced as a computer implemented method, embodied as a program on a computer-readable medium, or provided as a part of a computer system. Embodiments of the invention provide techniques for creating queries that include a condition based on measurements recorded for a continuous value field correlated with another condition. In other words, embodiments of the invention provide techniques for processing a query with a group of two or more independent conditions that should be evaluated using data values recorded for the same point in time. For example, using the weight and hemoglobin test conditions referenced above, a query that correlates a person's weight (as the continuous value field) with individual measurements of the hemoglobin value (as the "other" field) may be created and executed using the techniques of the present invention. In one embodiment, a query building interface may allow a user to specify that a condition should be processed as continuous value condition, relative to another condition, during the query building process.

Embodiments of the invention further provide techniques for processing such a query. In one embodiment, approximate values are created for the continuous value field to correlate with the actual values available for another condition. For example, if an actual weight value is unavailable for a particular hemoglobin test value, then an approximation of weight may be used to evaluate query conditions. The approximated values may be generated using any appropriate algorithm (e.g., a regression based on the available data for the continuous field), and may be used only for correlation for a given query execution, or may be stored back into the database for subsequent reuse. In the latter case, the approximated values may be labeled as such to distinguish them from actual measurements for the continuous value field.

In one embodiment, a continuous value field may be a logical field specified by a database abstraction model (described in detail, below). Alternatively, columns in a relational table may be used as continuous value fields. In an environment using a database abstraction model, a logical field definition may include an attribute to indicate its status as a continuous value field, and may also specify an algorithm used to generate the approximate measurements of the continuous value property.

In one embodiment, using a relational database, (e.g., DB2® available from International Business Machines (IBM®) of Armonk, N.Y.), these continuous value attributes may be stored in system catalog tables similar to the way currency, data type, etc. attributes are typically maintained. During query processing, a runtime component may be configured to generate a temporary table to store both the actual and/or approximated values for the continuous field along with the available values for the other field (i.e., the one to be correlated). A query of this table may then be executed to identify values that contemporaneously satisfy the conditions for both the continuous field and the other field.

Because of the complexity associated with low-level database query languages (e.g., SQL), users often turn to database query applications to assist them in composing queries of a database. One technique for managing the complexity of a relational database, and the SQL query language, is to use database abstraction techniques. Commonly assigned U.S. patent application Ser. No. 10/083,075 (the '075 application) entitled "Application Portability and Extensibility through Database Schema and Query Abstraction," discloses techniques for constructing a database abstraction model over an underlying physical database.

The '075 application discloses embodiments of a database abstraction model constructed using logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators that are available in SQL (e.g., comparison operators such as =, >, <, >=, and, <=, and logical operators such as AND, OR, and NOT), although novel operators may also be provided. Data is retrieved from the physical database by generating a resolved query (e.g., an SQL statement) from the abstract query. Thus, the database abstraction model is tied to neither the syntax nor the semantics of the physical database, and additional capabilities may be provided by the without having to modify the underlying database.

The following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of computer-readable media. Illustrative computer-readable media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such computer-readable media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, application programs are described herein using discrete modules or components interacting with one another. Those skilled in the art recognize, however, that different embodiments may combine or merge such components and modules in many different ways.

Moreover, examples described herein reference medical research environments. These examples are provided to illustrate embodiments of the invention, as applied to one type of data environment. The techniques of the invention, however, are contemplated for any data environment including, for example, transactional environments, financial environments, research environments, accounting environments, legal environments, and the like.

The following material first describes a typical embodiment of the database abstraction model. Using this model, continuous value fields are then described as an enhancement to the database abstraction model. Those skilled in the art will recognize, however, that the techniques described herein for managing continuous value data and for query processing may be extended or applied to other database environments, including a relational database system, and other data storage models, whether currently known or later developed.

The Database Abstraction Model: Physical View of the Environment

FIG. 1 illustrates a networked computer system using a client-server configuration. Client computer systems $105_{1-N}$ each include a network interface that enables communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on client system 105, (e.g., a Linux® distribution, Microsoft Windows®), IBM's AIX® or OS/400®), FreeBSD, and the like). ("Linux" is a registered trademark of Linus Torvalds in the United States and other countries.)

The server system 110 may include hardware components similar to those used by client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The client-server configuration illustrated in FIG. 1, however, is merely exemplary of one hardware and software configuration. Embodiments of the present invention may be implemented using other configurations, regardless of whether the computer systems are complex multi-user computing systems, such as a cluster of individual computers connected by a high-speed network, single-user workstations, or network appliances lacking non-volatile storage. Additionally, although FIG. 1 illustrates computer systems using a client-server architecture, embodiments of the invention may be implemented in a single computer system, or in other configurations, including peer-to-peer, distributed, or grid architectures.

In one embodiment, users interact with the server system 110 using a graphical user interface (GUI) provided by query building interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and the application 120 may be configured to allow a user to compose an abstract query, and to submit the query to the runtime component 114.

As illustrated in FIG. 1, server system 110 may further include runtime component 114, DBMS server 116, and database abstraction model 148. In one embodiment, these components may be provided as software applications executing on the server system 110. DBMS server 116 includes a software application configured to manage databases $214_{1-3}$. That is, the DBMS server 116 communicates with the underlying physical database system, and manages the physical database environment behind the database abstraction model 148. In one embodiment, users interact with the query interface 115 to compose and submit an abstract query to the runtime component 114 for processing. In turn, the runtime component 114 receives an abstract query and, in response, generates a query of underlying physical databases 214.

In one embodiment, the runtime component may be configured to generate a query (e.g., an SQL statement) from an abstract query. Typically, users compose an abstract query from the logical fields defined by the database abstraction model 148, and the runtime component 114 may be configured to use the access method defined for a logical field 208 when generating a query of the underlying physical database (referred to as a "resolved" or "physical" query) from an abstract query. Logical fields and access methods are described in greater detail below in reference to FIGS. 2A-2C. Additionally, the runtime component 114 may also be configured to return query results to the requesting entity, (e.g., using HTTP server 118, or equivalent).

The Database Abstraction Model: Logical View of the Environment

Figure 2A:
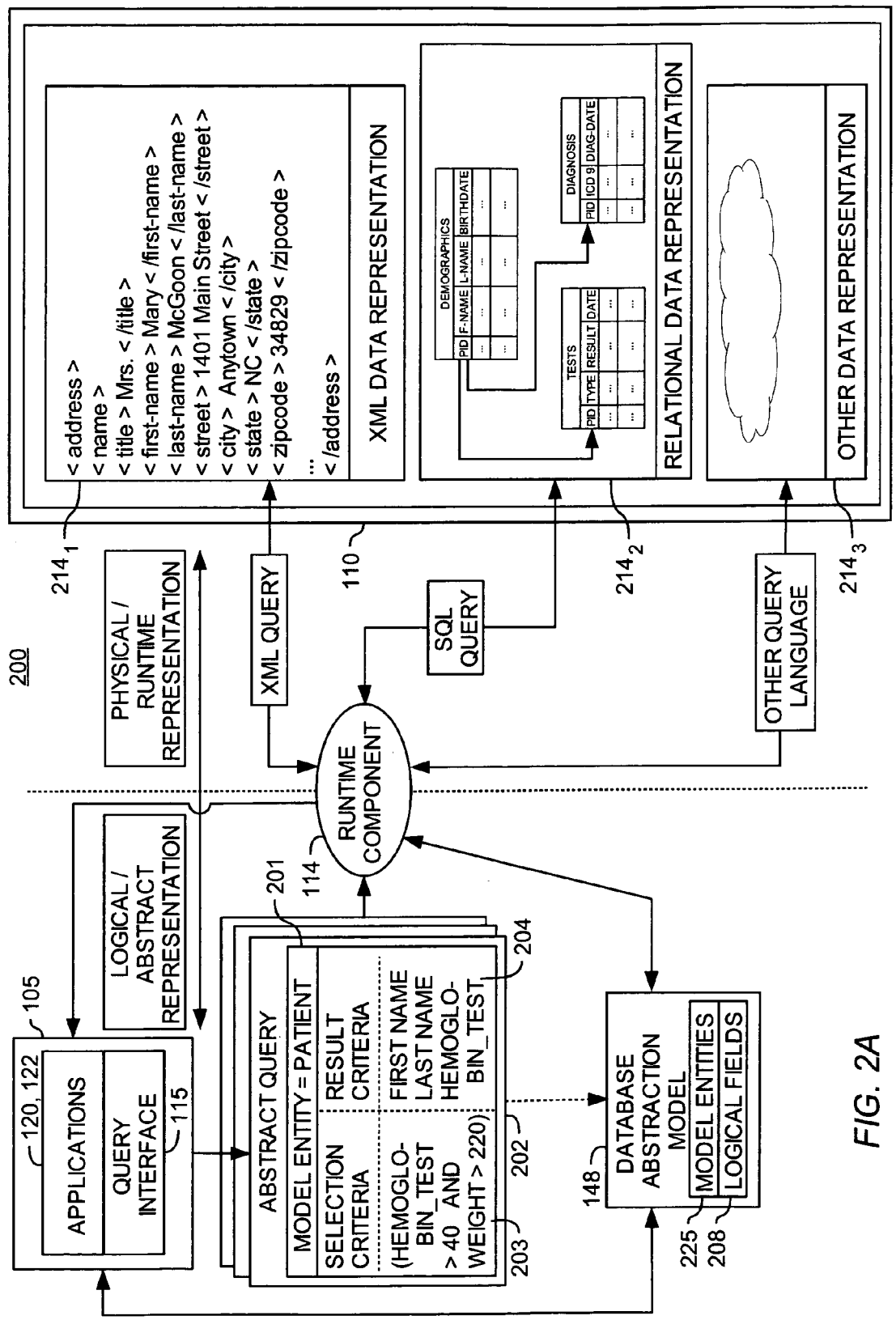
FIG. 2A illustrates a logical view of the database abstraction model, according to one embodiment of the invention.

FIG. 2A is a functional block diagram illustrating interrelated components of the invention, and also illustrates the relationship between the logical view of data provided by the database abstraction model components (the left side of FIG. 2A), and the underlying physical database components (the right side of FIG. 2A).

In one embodiment, the database abstraction model 148 provides definitions for a set of logical fields 208 and model entities 225. Users compose an abstract query 202 by specifying logical fields 208 to include in selection criteria 203 and results criteria 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the focus of the abstract query 202 (e.g., a "patient", a "person", an "employee", a "test", a "facility" etc).

For example, abstract query 202 includes an indication that the query is directed to instances of the "patient" model entity 201, and further includes selection criteria 203 that includes two conditions: "hemoglobin_test>40" and "weight>220". The selection criteria 203 are composed by specifying a condition evaluated against the data values corresponding to a logical field 208 (in this case the "hemoglobin_test" logical field and the "weight" logical field). The operators in a condition typically include comparison operators such as =, >, <, >=, or, <=, and logical operators such as AND, OR, and NOT. Results criteria 204 indicates that data retrieved for instances of the model entity that satisfy the selection criteria 203 includes data for the "name," "age," and "hemoglobin_test" logical fields 208.

The definition for each logical field 208 in the database abstraction model 148 specifies an access method identifying the location of data in the underlying physical database 214. In other words, the access method defined for a logical field provides a mapping between the logical view of data exposed to a user interacting with the interface 115 and the physical view of data used by the runtime component 114 to retrieve data from the physical databases 214.

Additionally, the database abstraction model 148 may define a set of model entities 225 that may be used as the focus, or central concept, for an abstract query 202. In one embodiment, users select which model entity to query as part of the query composition process. Model entities are descried below, and further described in commonly assigned, co-pending application Ser. No. 10/403,356, filed Mar. 31, 2003, entitled "Dealing with Composite Data through Data Model Entities," incorporated herein by reference in its entirety.

In one embodiment, the runtime component 114 retrieves data from the physical database 214 by generating a resolved query (e.g., an SQL statement) from the abstract query 202. Depending on the access method specified for a logical field, the runtime component 114 may transform abstract query 202 into an XML query that queries data from database $214_1$, an SQL query of relational database $214_2$, or other query composed according to another physical storage mechanism using other data representation $214_3$, or combinations thereof (whether currently known or later developed).

An illustrative abstract query, corresponding to abstract query 202, is shown in Table I below. In this example, the abstract query 202 is represented using eXtensible Markup Language (XML). In one embodiment, query building interface 115 may be configured to generate an XML document to represent an abstract query composed by a user. Those skilled in the art will recognize that XML is a well known markup language used to facilitate the sharing of structured text and information. However, other markup languages or data representation techniques may be used.

TABLE I

Query Example

```
001  <?xml version="1.0"?>
002  <!--Query string representation: ("Hemoglobin_test > 20")
003  <QueryAbstraction>
004    <Selection>
005      <Condition>
006        <Condition field="Hemoglobin Test" operator="GT"
             value="40"
007      </Condition>
008      <Condition>
009        <Condition field="weight" operator="GT" value="220"
010      </Condition>
011    </Selection>
012    <Results>
013        <Field name="Name"/>
014        <Field name="Age"/>
015        <Field name="hemoglobin_test"/>
016    </Results>
017    <Entity name="patient" >
018        <FieldRef name="data://patient/PatientID" />
019          <Usage type="query" />
020       </EntityField>
021    </Entity>
022  </QueryAbstraction>
```

The XML markup shown in Table I includes the selection criteria 203 (lines 004-011) and the results criteria 204 (lines 012-016). Selection criteria 203 includes a field name (for a logical field), a comparison operator (=, >, <, etc) and a value expression (what the field is being compared to). In one embodiment, the results criteria 204 include a set of logical fields for which data should be returned. The actual data returned is for instances of the model entity with data consistent with the selection criteria 203. Line 17 identifies the model entity selected by a user, in this example, a "patient" model entity 201. Line 18 indicates the identifier in the physical database 214 used to identify instances of the model entity. In this case, instances of the "patient" model entity are identified using values from the "Patient ID" column of a patient table.

After composing an abstract query 202 a user may provide it to runtime component 114 for processing. The runtime component 114 may be configured to process the abstract query 202 by generating an intermediate representation, such as an abstract query plan. In one embodiment, an abstract query plan is composed from a combination of abstract elements from the data abstraction model and physical elements relating to the underlying physical database. For example, an abstract query plan may identify which relational tables and columns are referenced by which logical fields included in the abstract query, and further identify how to join columns of data together. The runtime component may then parse the intermediate representation in order to generate a physical query of the underlying physical database (e.g., an SQL statement (or statements) executed against database $214_2$)). Abstract query plans and query processing techniques are further described in a commonly assigned, co-pending application entitled "Abstract Query Plan," Ser. No. 11/005,418, filed Dec. 6, 2004, which is incorporated by reference herein in its entirety.

The Database Abstraction Model: Logical Fields

Figure 2B:
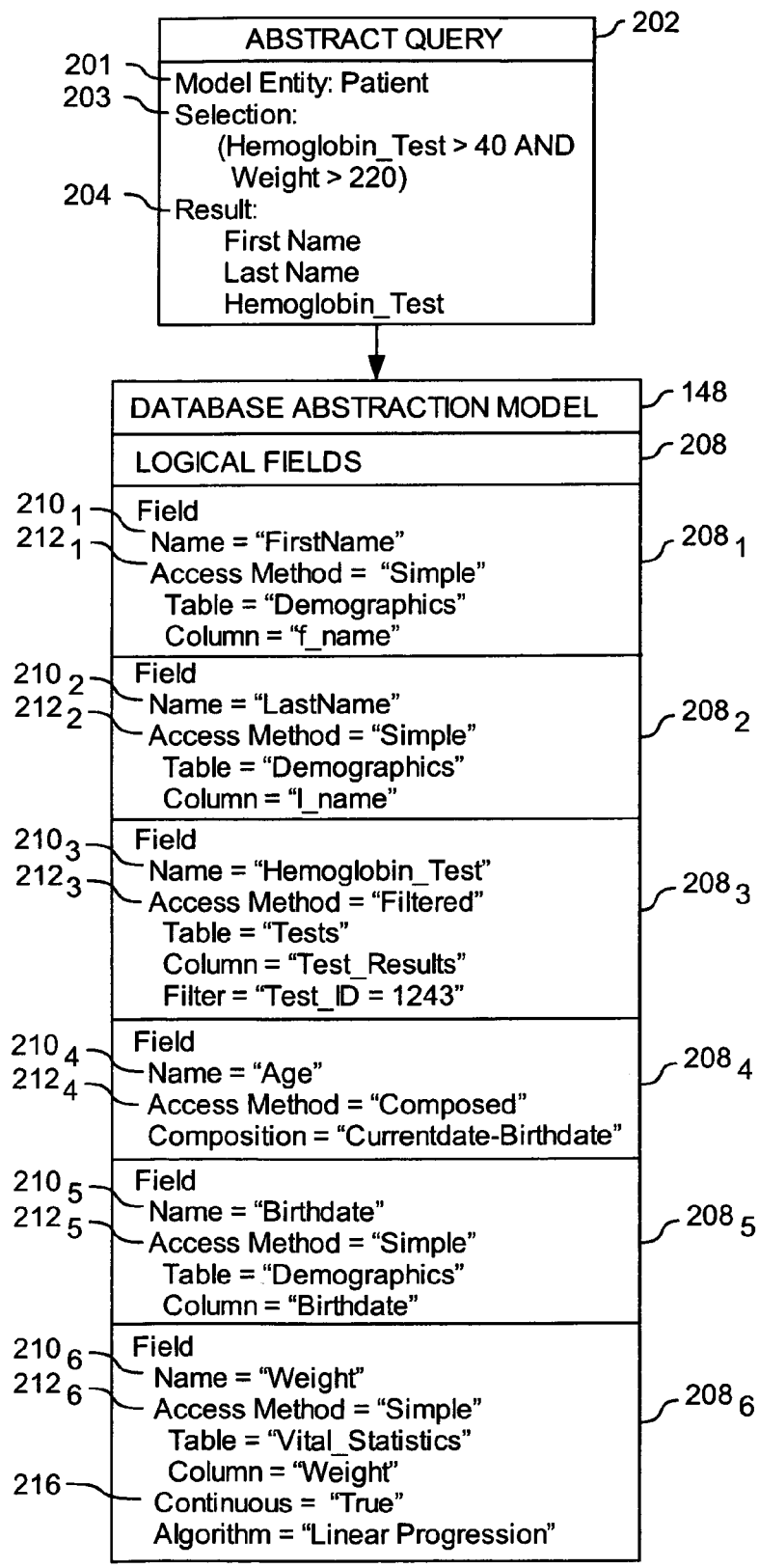
FIGS. 2B-2C illustrate an exemplary abstract query and database abstraction model, according to one embodiment of the invention.

FIG. 2B illustrates abstract query 202 along with an embodiment of a database abstraction model 148 using a plurality of logical field specifications $208_{1-6}$ (six shown by way of example). The access methods included in the logical field specifications 208 (or logical field, for short) map these logical fields 208 to tables and columns in an underlying relational database (e.g., database $214_2$ shown in FIG. 2A). As illustrated, each field specification 208 identifies a logical field name $210_{1-6}$ and an associated access method $212_{1-6}$. Depending upon the different types of logical fields, any number of access methods may be supported by the database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$, $208_5$, and $208_6$ each provide a simple access method, $212_1$, $212_2$, $212_5$, and $212_6$ respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics." Similarly, $208_2$, $208_5$, and $208_6$ map to other tables/columns of database $212_2$. In addition, logical field $206_6$ includes a continuous property attribute 216 (Continuous="TRUE") indicating that data for logical field $206_6$ may be processed as a continuous value field.

Logical field specification $208_3$ exemplifies a filtered field access method. Filtered access methods identify an associated physical database and provide rules that define a particular subset of items within the underlying database that should be returned for the filtered field or used for comparison purposes. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "Test_Result" column of a "Tests" tests table and defines a filter "Test_ID='1243.'" Only data from rows of a table that satisfies the filter are returned for this logical field, or used to evaluate a query condition. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be determined and provided to a user. For example, logical field access method $212_4$ illustrates a composed access method that maps the logical field "age" $208_4$ to another logical field 208₅ named "birthdate." In turn, the logical field "birthdate" 208₅ maps to a column in a demographics table of relational database 214₂. In this example, data for the "age" logical field 208₄ is computed by retrieving data from the underlying database using the "birthdate" logical field 208₅, and subtracting a current date value from the birth date value to calculate an age value returned for the logical field 208₄.

By way of example, the field specifications 208 of the data repository abstraction component 148 shown in FIG. 2B are representative of logical fields mapped to data represented in the relational data representation 214₂. However, other instances of the data repository abstraction component 148 or other logical field specifications may map to other physical data representations (e.g., databases 214₁ or 214₃ illustrated in FIG. 2A). Further, in one embodiment, the database abstraction model 148 is stored on computer system 110 using an XML document that describes the model entities, logical fields, access methods, and additional metadata that, collectively, define the database abstraction model 148 for a particular physical database system. Other storage mechanisms or markup languages, however, are also contemplated.

The Database Abstraction Model: Model Entities

Figure 2C:
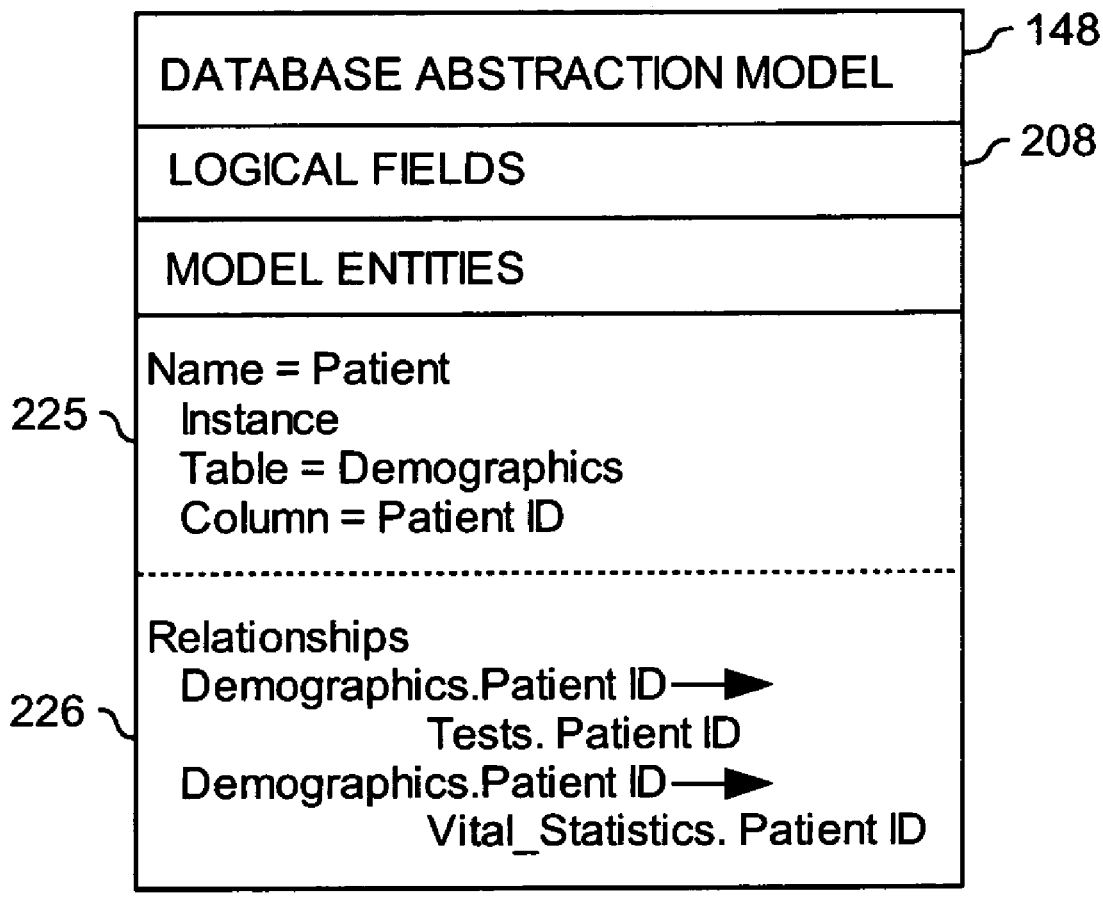

FIG. 2C further illustrates the exemplary database abstraction model 148. In addition to logical fields 208, the database abstraction model 148 may include model entity definitions 225. FIG. 2C illustrates a definition for the "patient" model entity first illustrated in FIGS. 2A and 2B. In one embodiment, the conditions included in an abstract query are evaluated against instances of the model entity in the underlying database. As illustrated, model entity definition 225 includes a model entity name, model entity relationships, paths to related model entities, and path categories.

Illustratively, the "patient" model entity 225 is defined with a name (for the model entity, e.g., "patient") and an instance identifier used to distinguish between instances of the patient model entity. In this example, instances of the "patient" model entity are identified using values from the "patient ID" column of a demographic table in the physical database 214. Model entity relationships section 226 identifies the relationships between an instance of the "patient" model entity and data stored in other tables in the physical database 214. For example, the first model entity relationship indicates that data from a row of the demographics table and the tests table that share a common "patient ID" store data about the same individual patient. The relationships identified in section 226 define the "universe" of data about a particular model entity in the underlying physical database 214. Starting from the table storing the instance identifier for a model entity, the relationships in section 226 collectively identify a hierarchy of data related to instances of the model entity available in the underlying database.

The Database Abstraction Model: Continuous Value Fields

Embodiments of the invention allow users to compose a query that includes a condition based on measurements of a continuous value field that are also correlated with another condition. In other words, the query specifies two or more conditions that should be evaluated using data values recorded for the same point in time. For example, using the weight and hemoglobin conditions referenced above, a query that correlates a person's weight (as the continuous value field) with individual measurements of the hemoglobin value (as the "other" field) may be created. An example query and query results obtained using this query is illustrated in FIGS. 3-7.

Figure 3:
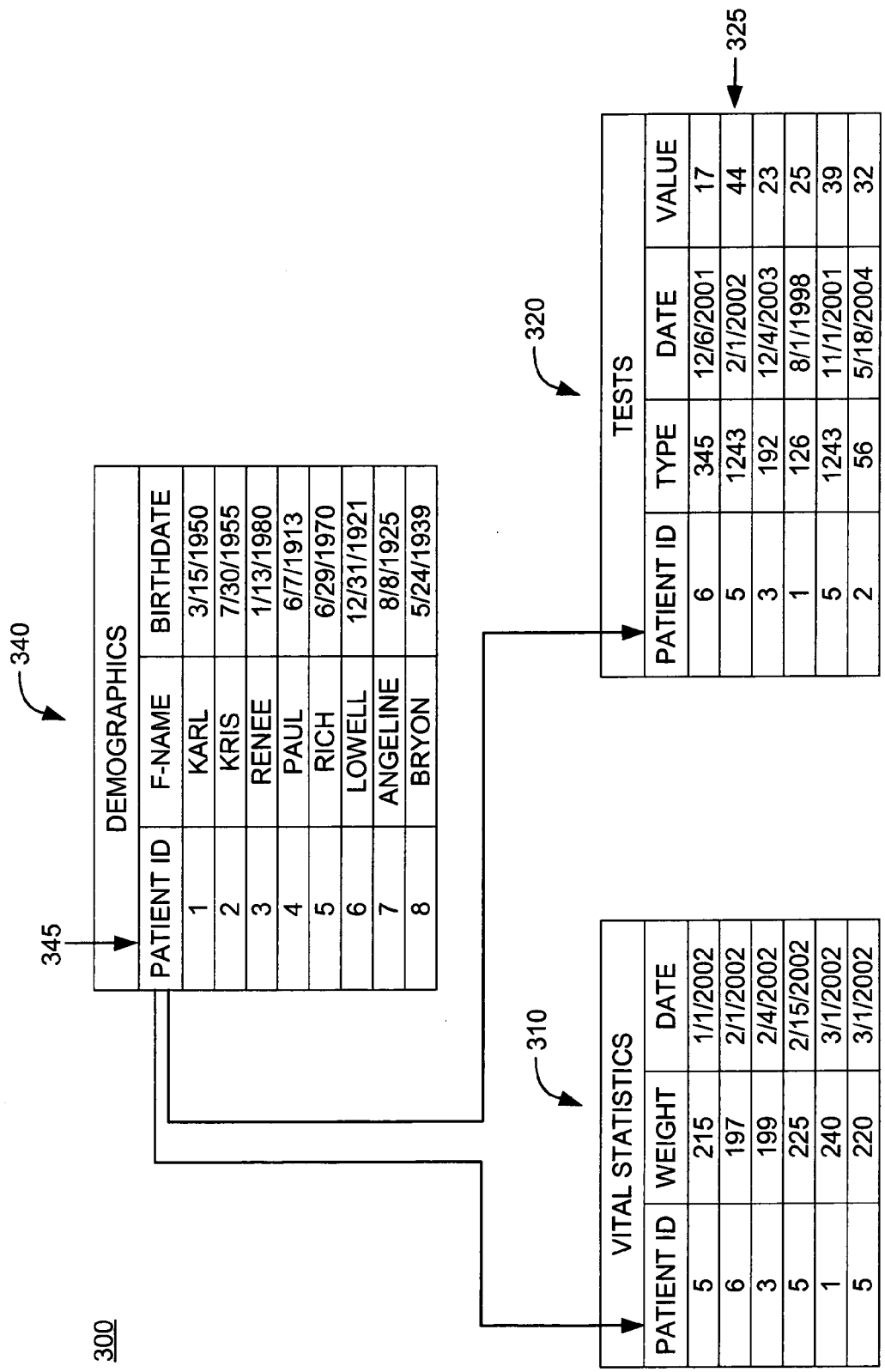
FIG. 3 illustrates an exemplary a set of relational database tables, used to illustrate different aspects of the invention.

FIG. 3 illustrates a set of relational database tables 300 corresponding to the database abstraction model illustrated in FIGS. 2A-2C. Database tables 300 include the tables and columns referenced by the logical fields 208, access methods 210, and model entities 225 (collectively, the database abstraction model 148). Specifically, demographics table 240 stores the "Patient ID" column 345 with the identifier used to distinguish between instances of the "patient" model entity. The "Patient ID" column 345 is related to a similar column in tables 310 and 320. Accordingly data from these tables may be joined to form query results using "Patient ID" values. Vital statistics table 310 and tests table 320 store data related to individual patients, including values for the hemoglobin tests and patient weight measurements.

Those skilled in the art will recognize, however, that the example database illustrated in FIG. 3 is simplified to illustrate embodiments of the present invention, and that a "production" database environment would likely include many more tables with additional columns, and more complex relationships between the tables.

Illustratively, assume that a user desires to compose a query that identifies individuals with a hemoglobin test over 40 while also weighing over 220 pounds. (i.e., abstract query 202, discussed above). Table II illustrates an SQL query corresponding to these conditions, using the tables illustrated in FIG. 3.

TABLE II

| SQL Query |
| --- |
| 001  select <result columns> from vitalStatistics, tests where |
| 002      vitalStatistics.patientId = tests.patientID and |
| 003      ((tests.type = 1243 and tests.value > 40) and |
| 004      weight > 220) and |
| 005      tests.date = vitalStatistics.date |

In this example, line 001 specifies columns from which to retrieve data, consistent with the query conditions. The remaining lines specify the conditions used to evaluate whether to include a particular patient ID value in the query results for this query. Line 002 joins the vital statistics and the tests tables based on patientID data. Line 003 specifies the condition for the hemoglobin values (namely, >40). Line 004 specifies a condition for the weight values (namely, >220). Finally, line 005 ties the weight and hemoglobin conditions together to find only patients where the data values for both hemoglobin and weight are recorded for the same date (namely, tests.date=vitalStatistics.date).

Using this query, the date for a particular data value from the weight column must be the same as the one for a corresponding hemoglobin test value in order for a given patient to be included in query results. Thus, even though the hemoglobin test in row 325 of the tests table 320 includes a hemoglobin value greater than 40, there is no corresponding weight value in the vital statistics table to evaluate the "weight>220" condition. Thus, the patient represented by this query will not be included in query results. As described above, however, oftentimes, the dates for these values may not coincide for a variety of reasons. Accordingly, embodiments of the invention use a continuous value field to correlate the data for conditions like the ones illustrated in the exemplary query of Table II.

In an embodiment using database abstraction techniques, a logical field definition 208 may specify that a given logical field may be processed as a continuous value field using a field attribute (e.g., attribute 216 of logical field $208_6$, illustrated in FIG. 2B). A logical field specification for such a field may also identify the algorithm used to determine approximation values for points in time for which an actual measurement does not exist. Different continuous value fields can, therefore, be modeled differently in how approximate values are generated. Some illustrative examples include:

Timeline based approximation: By relying on approximation between the known data points, approximations for the missing values can be provided. For example, a man with a weight of 200 on January 1 and 220 on March 1 could be assumed to have a weight of about 210 on February 1, and a weight very close to 200 on January 2.

Midpoint Selection: Regardless of the time involved, take the middle value between two known values. Using the above example, the weight value for the person on January 2 would be 210 (the midpoint of 200 and 220).

Trend Analysis: More complex statistical models may be used to generate a predicted value based on the available values. For example, a regression may be used to calculate a line (or other best fit model to fit a curve to a set of data points) may be used.

Figure 4:
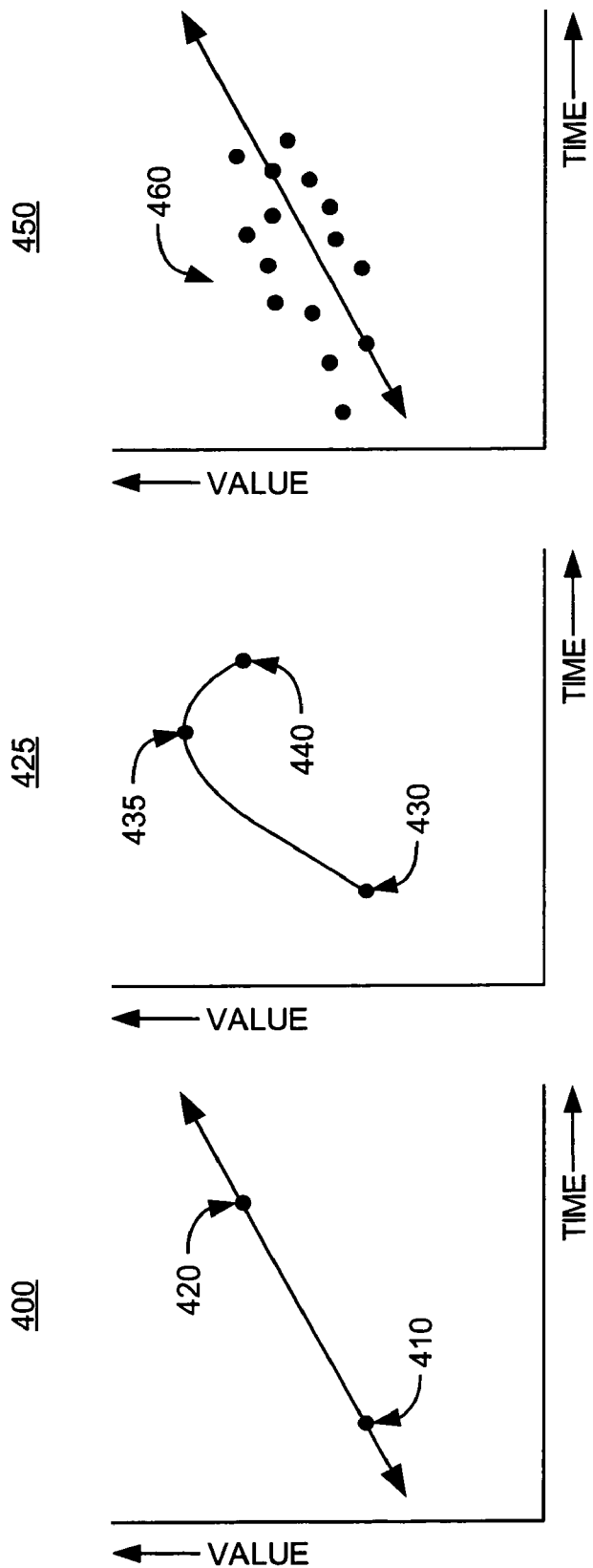
FIG. 4 illustrates data points for a continuous value property used to generate approximate values to be correlated with measurement values available for another property, according to one embodiment of the invention.

In many circumstances, data for the continuous value field can be represented as a curve on a graph. FIG. 4 illustrates a graph representation for generating approximate values from the actual data points recorded for the continuous value field.

For example, FIG. 4 illustrates three different representations of data for a continuous value field (e.g., the "weight" logical field $208_6$). Representation 400 includes two points (410 and 420) and a line generated between the two points. Points 410 and 420 represent data values for the continuous field that are available in database 300. The line connecting the two points is used to generate an approximate value for the continuous field that corresponds to any date or point in time that is needed. Representation 425 includes a similar display using three data points (430, 435, and 440). The three points are used to generate a curve of continuous data values. Finally, the graph 450 includes a scatter plot of points 460. From these points, a linear regression may be performed to generate a best fit line based on the input points. Each of the example representations illustrates a different technique for generating approximate values for a continuous value field.

Figure 5:
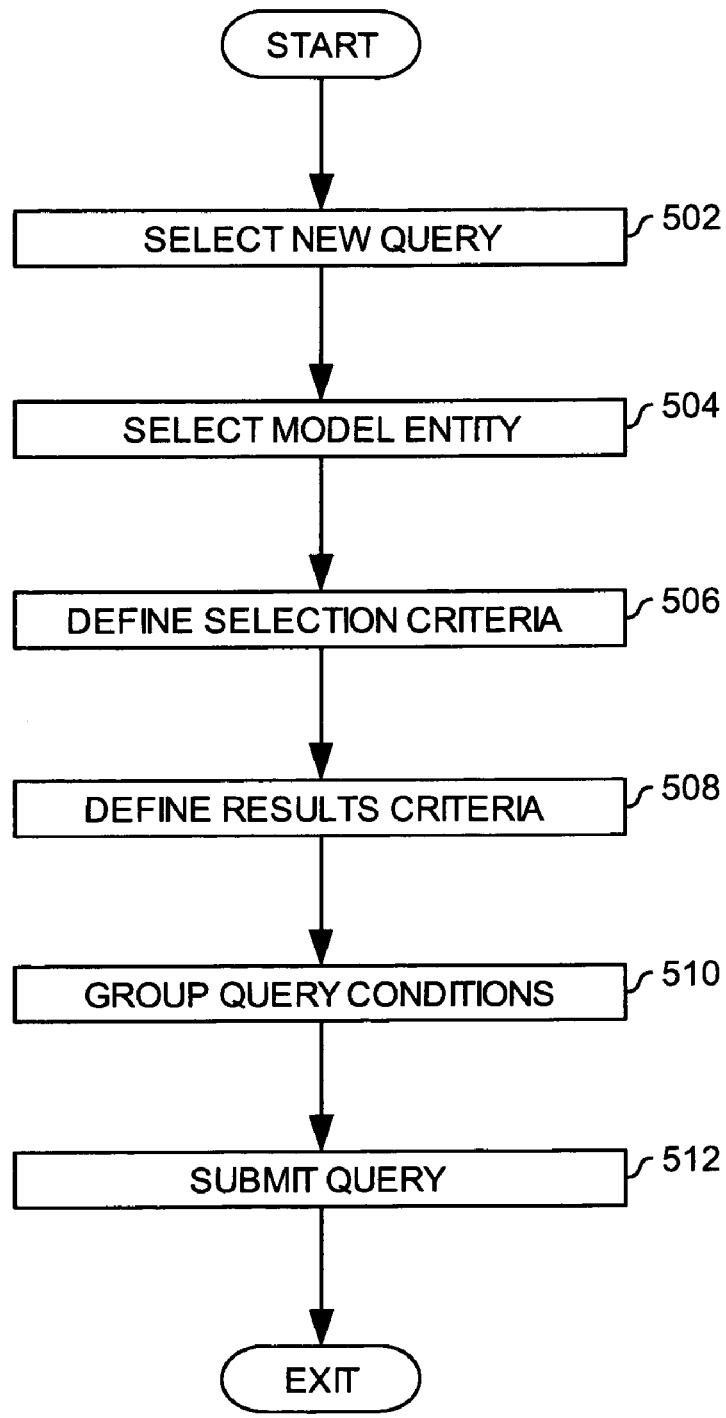
FIG. 5 illustrates a method for composing a query that includes a condition for a continuous property that needs to be correlated with a measurement for another property, according to one embodiment of the invention.
Figure 6:
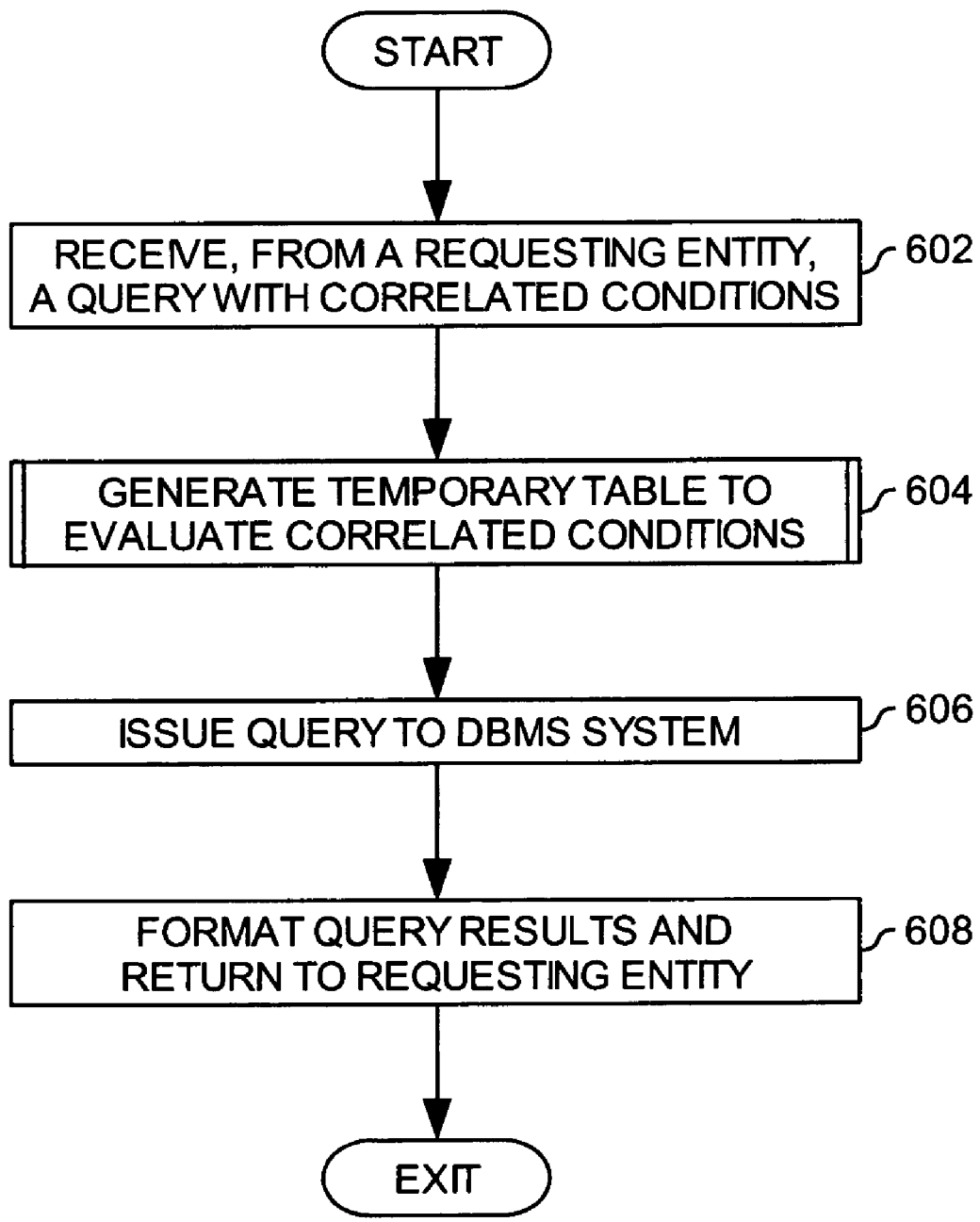
FIG. 6 illustrates a method for processing an abstract query to retrieve a set of query results, according to one embodiment of the invention.
Figure 7:
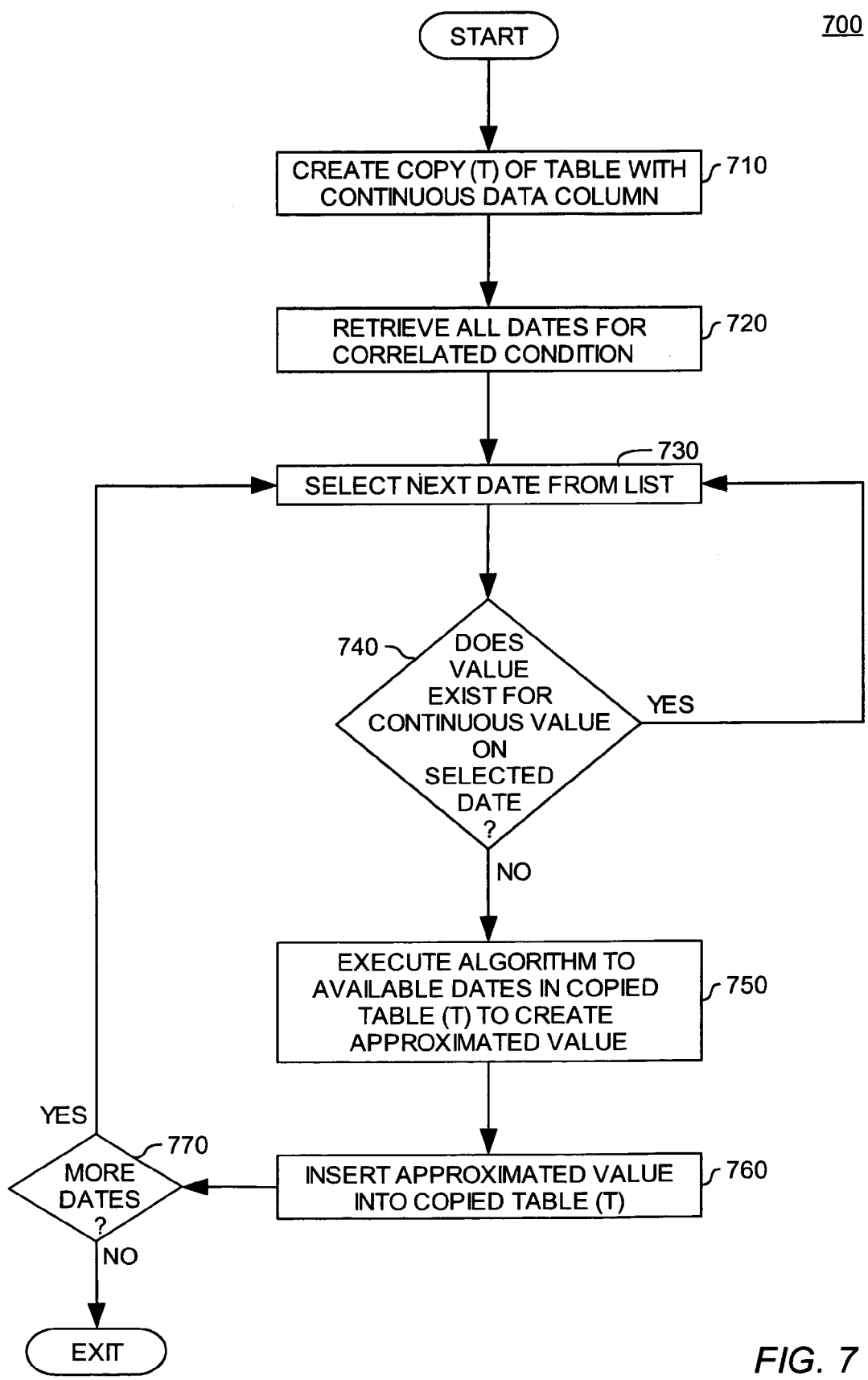
FIG. 7 illustrates a method for generating a set of measurements approximations for a continuous property, according to one embodiment of the invention.

FIGS. 5-7 illustrate exemplary methods that take advantage of a continuous value field. FIG. 5 illustrates a method that may be used to generate an abstract query that includes correlated conditions. FIG. 6 illustrates a method for processing such a query, and FIG. 7 illustrates a method to generate a temporary table used to store approximations of the continuous value field. The temporary table stores the approximate values for comparison with measurement values from another correlated condition.

Referring first to FIG. 5, a method is illustrated for composing a query that includes a condition for a continuous property that needs to be correlated with a measurement for another property, according to one embodiment of the invention. The method 500 begins at step 502 wherein a user selects to compose a new query (e.g., by interacting with a GUI construct provided by query building interface 115). Alternatively, a user may select to load and edit a saved query. In one embodiment, a user first selects a model entity to query (step 504). Thereafter, a user specifies the selection criteria and results criteria for the query (steps 506 and 508). At step 510, a user may select conditions to group together. That is, a user may select two or more conditions that should be correlated with one another. If a user selects to group together logical fields, and if one of the fields has continuous value attributes 216 as part of its logical field definition, then data for that logical field may rely on approximated values to evaluate the conditions. One embodiment of method for processing this query is further illustrated in FIGS. 6-7. At step 512, once a query is completed, a user may submit the query for processing. In one embodiment, the runtime component 114 receives the abstract query over network 104 using well-known data communication protocols, and the abstract query itself may be represented using a structured mark-up language (e.g., using the XML representation of abstract query 202 illustrated in Table I).

FIG. 6 illustrates a method 600 for processing a database query to retrieve a set of query results, according to one embodiment of the invention. The method begins at step 602 after a user has composed a query that specifies at least two conditions that should be correlated with one another. In other words, the query specifies two or more conditions that should be evaluated using data values recorded for the same point in time. In one embodiment, the query is an abstract query composed using the logical fields 208 provided by the database abstraction model 148, and the query interface 115 may include graphical control elements that allow a user to specify which conditions should be correlated with one another.

Once the query is completed, a user selects to execute the query and submits the query to a database system for processing For example, an abstract query 202 may be submitted for execution to runtime component 114. In one embodiment, the runtime component 114 is configured to access the logical fields and conditional expressions specified by the abstract query, along with the definitions for the logical fields, access methods, and model entity definitions from the database abstraction model 148. Using this data, the runtime component generates a query of the underlying database (step 604). As part of processing the received query, runtime competent 114 may be configured to generate a temporary table that includes all of the data needed to evaluate the correlated conditions of the abstract query (step 604).

At step 606, after generating the resolved query, the runtime component 114 issues the resolved query to the underlying physical database 214. After executing the resolved query, query results are returned to the user at step 608. In one embodiment, data values retrieved for the correlated condition are stored in the temporary table, and used to generate approximated values, as necessary, for comparison with the correlated condition (FIG. 7). Additional examples of transforming an abstract query into a resolved query are further described in commonly assigned U.S. patent application Ser. No. 10/083,075 (the '075 application) entitled "Application Portability and Extensibility through Database Schema and Query Abstraction," which is incorporated herein by reference in entirety.

FIG. 700 illustrates a method for generating a set of measurements that approximate data for a continuous property, according to one embodiment of the invention. The method may be performed as part of processing an abstract query, (e.g., as part of step 604 of FIG. 6.) At step 710, a temporary table (T) is created with columns to store data for the continuous value field, along with data values for the correlated condition. Initially, the temporary table includes the values corresponding to the points in time for which actual data is available. For example, vital statistics table 310 includes three separate measurement values in the weight column. Accordingly, temporary table (T) may be seeded with these values.

At step 720, a list of dates for the correlated condition is determined. That is, a list of points in time is determined for which a corresponding continuous value is needed for correlation. In this example, the continuous value weight is being correlated with discrete instances of hemoglobin test. Tests table 320 includes a hemoglobin test measurement recorded with a dates of Nov. 1, 2001 and Feb. 1, 2002. Accordingly these dates are used for the list determined at step 720. Table III illustrates the state of Temporary table (T) after step 720 and 730, using data from database 300.

TABLE III

Temporary Table

| Row Number | Date | Weight | Approximation flag | Hemoglobin |
|---|---|---|---|---|
| 1 | Nov. 1, 2001 | | | 39 |
| 2 | Jan. 12, 2002 | 215 | | |
| 3 | Feb. 1, 2002 | | | 44 |
| 4 | Feb. 15, 2002 | 225 | | |
| 5 | Mar. 1, 2002 | 220 | | |

Note that although data values exist for the weight column and the hemoglobin column, no single row includes values for both.

Steps 730-770 comprise a loop used to generate approximations for the continuous value property measurement. The approximations are generated, as needed, to ensure that for every recorded value of the discrete property measurement (e.g., the hemoglobin value) there is a corresponding value for the continuous property measurement (e.g., the weight value). At step 730, a date is selected from the list of dates determined at step 720. At step 740, the method determines whether there is a value for the continuous value property with the same date. If so, the method returns to step 730 and selects a new date. That is, if there is a value for the continuous property corresponding to the selected date, there is no need to create an approximation. Otherwise, the method proceeds to step 750 and generates an approximation. The approximation may be generated using any of the algorithms described above in reference to FIG. 4, or may employ other algorithms for generating an approximate value, whether known or novel. At step 760, the approximated value is inserted into temporary table T. At step 770, the method queries whether there are additional entries in the list generated at step 720, if not the method proceeds to step 780 and concludes. Otherwise, a new date is selected (step 730) and the looping steps of 740-770 are repeated.

Table IV illustrates the table after the looping steps have been completed to generate approximated values for the continuous value property.

TABLE IV

Temporary Table

| Row Number | Date | Weight | Approximation flag | Hemoglobin |
|---|---|---|---|---|
| 1 | Nov. 1, 2001 | 210 | True | 39 |
| 2 | Jan. 12, 2002 | 215 | | |
| 3 | Feb. 1, 2002 | 221 | True | 44 |
| 4 | Feb. 15, 2002 | 225 | | |
| 5 | Mar. 1, 2002 | 220 | | |

Now, the table contains values to perform the correlated comparison. Namely, the ((weight>220) AND (hemoglobin>40)) condition specified by abstract query 202. Once the approximated values are entered into temporary table (T), the query engine can evaluate the correlated condition. After comparing each row that includes a value for both of the conditions, rows satisfying the condition are included in the in query results returned to a user.

Those skilled in the art will recognize several optimizations and/or modifications for the method 700 could be envisioned, all within the scope of the present invention. For example, the approximations may be stored directly in the vital statistics table as they are created with additional columns flagging the added values as approximations and specifying which algorithm was used to generate the approximation. This would allow the system to avoid having to regenerate to approximate values for all queries.

Further, the "one-way" process described above could be applied in a "two-way" manner. For example, a query may specify two conditions to be correlated with one another. After generating approximated values for the first condition, to evaluate against recorded data values for the second condition, the process may be repeated to generate approximated values for the second condition to evaluate using recorded data values for the first condition. Each new approximation allows for additional test comparisons, thereby creating additional opportunities for matching data to be returned to a user.

CONCLUSION

Embodiments of the invention provide techniques for evaluating a group of query conditions, using data values correlated for specific points in time. In one embodiment, a query may specify two or more conditions that should be evaluated using data values recorded for the same point in time. For example, when one condition measures a discrete value (e.g., the results of a medical test) a researcher may wish to correlate this with another, continuous valued condition (e.g., a patient's weight, temperature, etc). Unless a measurement is available for both conditions at the same point in time, a comparison of the conditions is not possible. Embodiments of the invention address this problem by generating approximate values for the continuous property that correspond to instances of the discrete property, as needed. This allows for more comprehensive query results to be retrieved without adding any complexity to the query composition processes.

While the foregoing is directed to embodiments of the present invention, other and further embodiments of the invention may be devised without departing from the basic scope thereof, and the scope thereof is determined by the claims that follow.

What is claimed is:

1. A computer implemented method of processing a computer database query, comprising:
receiving a query, wherein the query includes a first condition, a second condition, and an indication that data values used to evaluate the first and second condition should be temporally correlated to one another;
executing, on one or more processors, a program for generating a query result for the received query, wherein the executing comprises:
determining, for each of a first set of data values used to evaluate the first condition, a first timestamp;
determining, for each of a second set of data values used to evaluate the second condition, a second timestamp;
generating a temporary table with a first column storing the first set of data values, a second column storing the second set of data values, and a third column storing the first and second timestamps associated with the first and second set of data values;

for each data value in the first column:
determining whether a data value for the second condition is recorded in the second column of the temporary table and has a second timestamp matching the first timestamp associated with the data value for the first condition, the matching timestamps being stored in the third column, upon determining a data value for the second condition is not recorded in the temporary table, generating an approximated value, using a continuous value function, for the second condition corresponding to the timestamp associated with the first condition, based on the second set of data values available for the second condition recorded in the temporary table, and
storing the approximated value for the second condition in the second column of the temporary table;
evaluating the first and second condition using the data values for the first condition and the approximated value for the second condition; and
returning query results for the query, consistent with the evaluation, wherein the query results include at least the approximated value.

2. The method of claim 1, wherein generating the approximated value comprises:
retrieving data elements for the second condition from the temporary table; and
generating the continuous value function based on the retrieved data elements, wherein the continuous value function is sampled using the first timestamp to generate the approximated value.

3. The method of claim 2, further comprising, storing the approximated value in a database after the query is processed.

4. The method of claim 2, wherein the approximated value are marked to distinguish it from other recorded values for the second condition.

5. The method of claim 1 wherein a database query is an abstract query, defined according to a database abstraction model, wherein the database abstraction model comprises a plurality of logical field definitions, each of the definitions comprising a logical field name, at least one location attribute identifying a location of physical data corresponding to the logical field name, and a reference to an access method selected from at least two different access method types; wherein each of the different access methods types defines a different manner of exposing the physical data corresponding to the logical field name of the respective logical field definition, and wherein the abstract query is composed according to a query specification that defines an interface to the plurality of logical field definitions.

6. The method of claim 1 wherein at least one logical field definition further specifies a continuous value attribute indicating that data elements for the logical field may be used to generate the approximated value and an algorithm for processing the data elements for the logical field.

7. The method of claim 1, further comprising: for each data value in the second column:
determining whether a data value for the first condition is recorded in the first column of the temporary table and has a timestamp value matching the timestamp value associated with the data value for the second condition, and
upon determining a data value for the first condition is not recorded in the temporary table, generating an approximated value for the first condition corresponding to the timestamp associated with the second condition, based on the first set of data values available for the first condition recorded in the temporary table, and
storing the approximated value for the first condition in the first column of the temporary table.

8. A computer-readable storage medium containing a program, which when executed on a processor performs an operation for accessing data stored in an underlying physical database, the operation comprising:
receiving a query, wherein the query includes a first condition, a second condition, and an indication that data values used to evaluate the first and second condition should be temporally correlated to one another;
determining, for each of a first set of data values used to evaluate the first condition, a first timestamp;
determining, for each of a second set of data values used to evaluate the second condition, a second timestamp;
generating a temporary table with a first column storing the first set of data values, a second column storing the second set of data values, and a third column storing the first and second timestamps associated with the first and second set of data values;
for each data value in the first column:
determining whether a data value for the second condition is recorded in the second column of the temporary table and has a second timestamp matching the first timestamp associated with the data value for the first condition, the matching timestamps being stored in the third column,
upon determining a data value for the second condition is not recorded in the temporary table, generating, using a continuous value function, an approximated value for the second condition corresponding to the first timestamp associated with the first condition, based on the second set of data values available for the second condition recorded in the temporary table, and
storing the approximated value for the second condition in the second column of the temporary table;
evaluating the first and second condition using the data values for the first condition and the approximate values for the second condition; and
returning query results for the query, consistent with the evaluation, wherein the query results include at least the approximated value.

9. The computer-readable storage medium of claim 8, wherein generating an approximated value comprises:
retrieving data elements for the second condition from the temporary table; and
generating the continuous value function based on the retrieved data elements, wherein the continuous value function is sampled using the first timestamp to generate the approximated value.

10. The computer-readable storage medium of claim 8, further comprising, storing the approximated value in a database after the query is processed.

11. The computer-readable storage medium of claim 10, wherein the approximated value are stored in a database in a manner to distinguish them from other recorded values used to evaluate the second condition.

12. The computer-readable storage medium of claim 8 wherein the database query is an abstract query, defined according to a database abstraction model, wherein the database abstraction model comprises a plurality of logical field definitions, each of the definitions comprising a logical field name, at least one location attribute identifying a location of physical data corresponding to the logical field name, and a reference to an access method selected from at least two different access method types; wherein each of the different access methods types defines a different manner of exposing the physical data corresponding to the logical field name of the respective logical field definition, and wherein the abstract query is composed according to a query specification that defines an interface to the plurality of logical field definitions.

13. The computer-readable storage medium of claim 8 wherein at least one logical field definition further specifies a continuous value attribute indicating that data elements for the logical field may be used to generate the approximated value and an algorithm for processing the data elements for the logical field.

14. The computer-readable storage medium of claim 8, wherein the operation further comprises:

for each data value in the second column:
  determining whether a data value for the first condition is recorded in the first column of the temporary table and has a timestamp value matching the timestamp value associated with the data value for the second condition, and
  upon determining a data value for the first condition is not recorded in the temporary table, generating an approximated value for the first condition corresponding to the timestamp associated with the second condition, based on the first set of data values available for the first condition recorded in the temporary table, and
  storing the approximated value for the first condition in the first column of the temporary table.

15. A system for processing a database query, comprising:
a computer, including at least a processor and a memory, configured to access a database;
a query building interface configured to allow a user to compose a query that includes at least a first condition and a second condition and that data values used to evaluate the first and second condition should be temporally correlated; and
a query processing application executed on the processor and configured to receive the query, and in response:
  to determine, for each of a first set of data values used to evaluate the first condition, a first timestamp;
  to determine, for each of a second set of data values used to evaluate the second condition, a second timestamp;
  to generate a temporary table with a first column storing the first set of data values, a second column storing the second set of data values, and a third column storing the first and second timestamps associated with the first and second set of data values;
  for each data value in the first column:
    to determine whether a data value for the second condition is recorded in the second column of the temporary table and has a second timestamp matching the timestamp associated with the data value for the first condition, the matching timestamps being stored in the third column, upon determining a data value for the second condition is not recorded in the temporary table, to generate, using a continuous value function, an approximated value for the second condition corresponding to the first timestamp associated with the first condition, based on the second set of data values available for the second condition recorded in the temporary table, and
    to store the approximated value for the second condition in the second column of the temporary table;
  to evaluate the first and second condition using the data values for the first condition and the approximated value for the second condition; and
  to return query results for the query, consistent with the evaluation, wherein the query results include at least the approximated value.

16. The system of claim of claim 15, wherein the query processing application is further configured to:
for each data value in the second column:
  to determine whether a data value for the first condition is recorded in the first column of the temporary table and has a timestamp value matching the timestamp value associated with the data value for the second condition, and
  upon determining a data value for the first condition is not recorded in the temporary table, to generate an approximated value for the first condition corresponding to the timestamp associated with the second condition, based on the first set of data values available for the first condition recorded in the temporary table, and
  to store the approximated value for the first condition in the first column of the temporary table.

* * * * *